United States Patent
Fujii et al.

(10) Patent No.: US 10,163,352 B2
(45) Date of Patent: Dec. 25, 2018

(54) DRIVING CONTROL DEVICE

(71) Applicant: HONDA MOTOR CO., LTD., Tokyo (JP)

(72) Inventors: Satoshi Fujii, Wako (JP); Kei Oshida, Wako (JP); Haruhiko Nishiguchi, Wako (JP); Daisuke Kubota, Wako (JP); Ryohsaku Arakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 15/252,962

(22) Filed: Aug. 31, 2016

(65) Prior Publication Data

US 2017/0061799 A1 Mar. 2, 2017

(30) Foreign Application Priority Data

Sep. 1, 2015 (JP) ................................. 2015-172100

(51) Int. Cl.
| | |
|---|---|
| *G08G 1/16* | (2006.01) |
| *B60W 30/18* | (2012.01) |
| *B60W 30/12* | (2006.01) |
| *B62D 15/02* | (2006.01) |
| *G06K 9/00* | (2006.01) |

(52) U.S. Cl.
CPC ............ *G08G 1/167* (2013.01); *B60W 30/12* (2013.01); *B60W 30/18163* (2013.01); *B62D 15/025* (2013.01); *B62D 15/0255* (2013.01); *G06K 9/00798* (2013.01)

(58) Field of Classification Search
CPC .......... B60W 30/12; B60W 30/18163; B60W 30/0956; B60W 30/18009; B60W 2420/52; B60W 2550/00; B60W 2720/24; B62D 15/0255; G06K 9/00798; G05D 1/0219; G05D 1/0088; G05D 2201/0213; G01C 21/3694; G08G 1/167; G08G 1/096827
USPC ..................................................... 701/25, 41
See application file for complete search history.

(56) References Cited

U.S. PATENT DOCUMENTS

| | | | |
|---|---|---|---|
| 2008/0183342 A1* | 7/2008 | Kaufmann | B60K 28/066 701/1 |
| 2012/0083947 A1* | 4/2012 | Anderson | B60W 30/09 701/3 |
| 2014/0229068 A1* | 8/2014 | Ueyama | B62D 15/0255 701/41 |

FOREIGN PATENT DOCUMENTS

| | | |
|---|---|---|
| JP | 10-309960 A | 11/1998 |
| JP | 2004-256076 A | 9/2004 |
| JP | 2008-94111 A | 4/2008 |
| JP | 2012-226392 A | 11/2012 |
| JP | 2015-20604 A | 2/2015 |

(Continued)

OTHER PUBLICATIONS

Office Action dated Oct. 2, 2018, issued in counterpart Japanese Application No. 2015-172100, with English machine translation. (6 pages).

*Primary Examiner* — Anne M Antonucci
*Assistant Examiner* — James E Stroud
(74) *Attorney, Agent, or Firm* — Westerman, Hattori, Daniels & Adrian, LLP

(57) ABSTRACT

When performing a switch between the lane change control and the lane keeping control, a switching controller of the driving control device sets a transition time-frame for performing the switch, and gradually switches between the lane change control and the lane keeping control during the transition time-frame.

13 Claims, 8 Drawing Sheets

(56) References Cited

FOREIGN PATENT DOCUMENTS

WO 2015/106875 A1 7/2015

\* cited by examiner

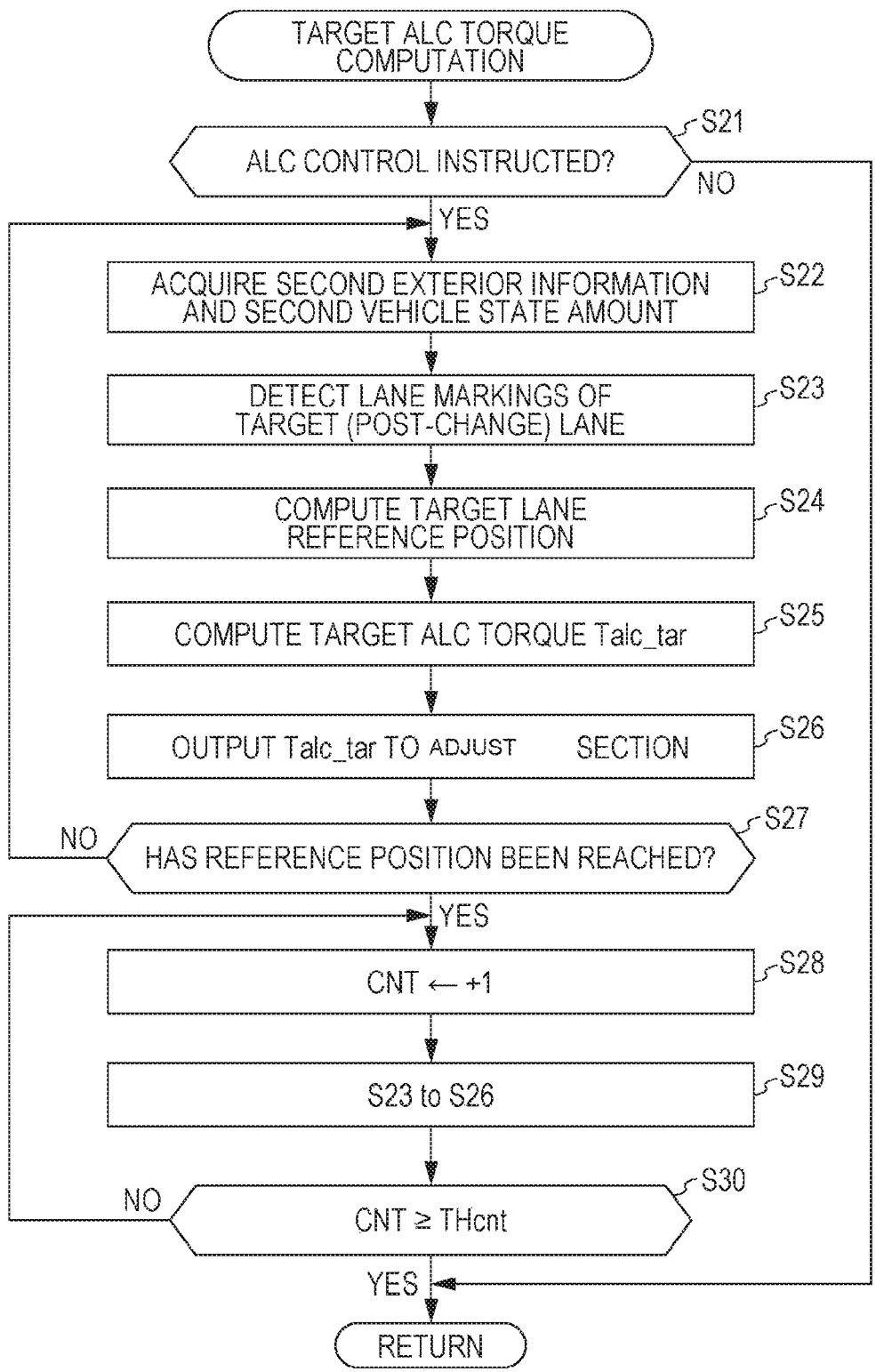

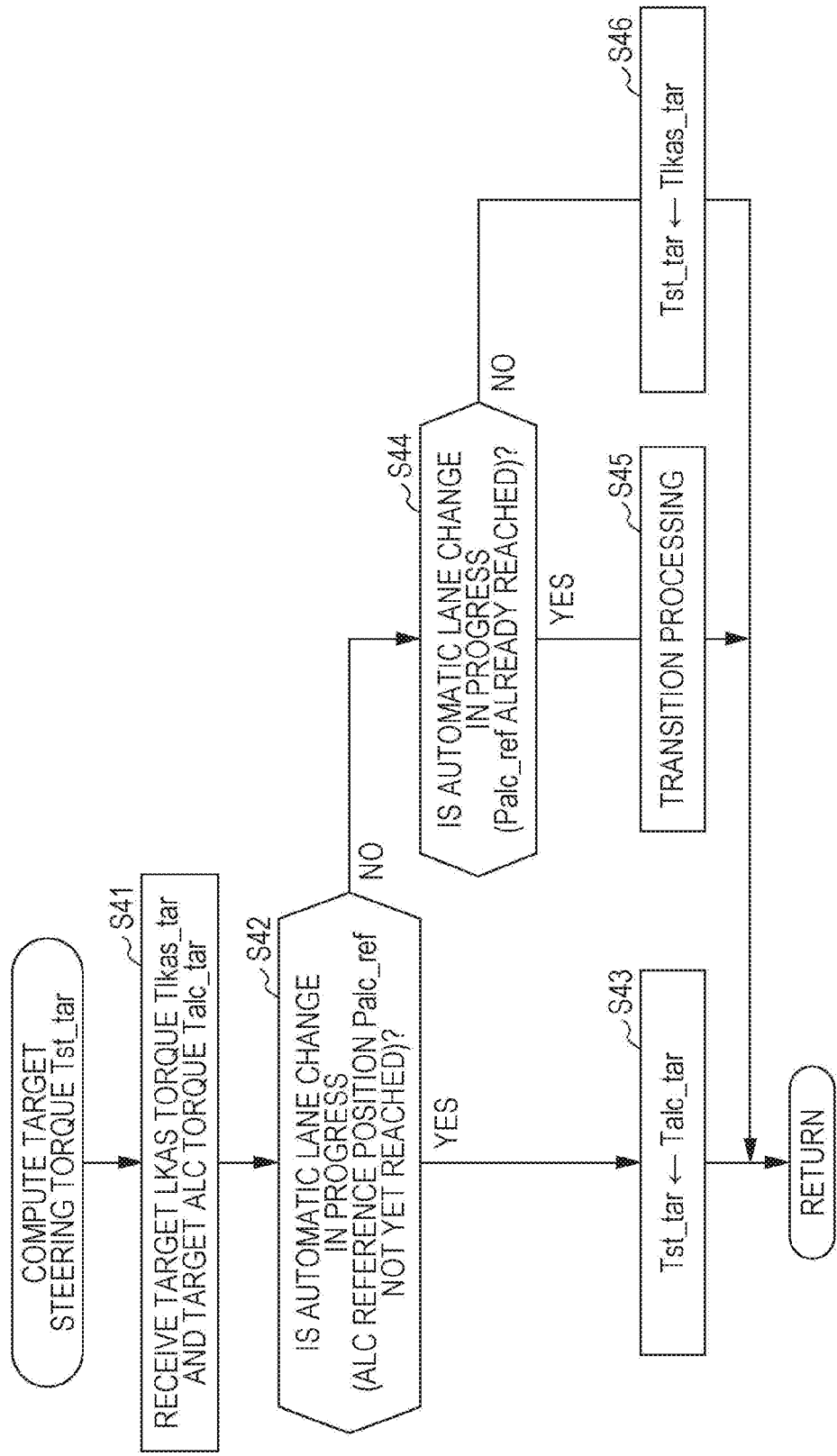

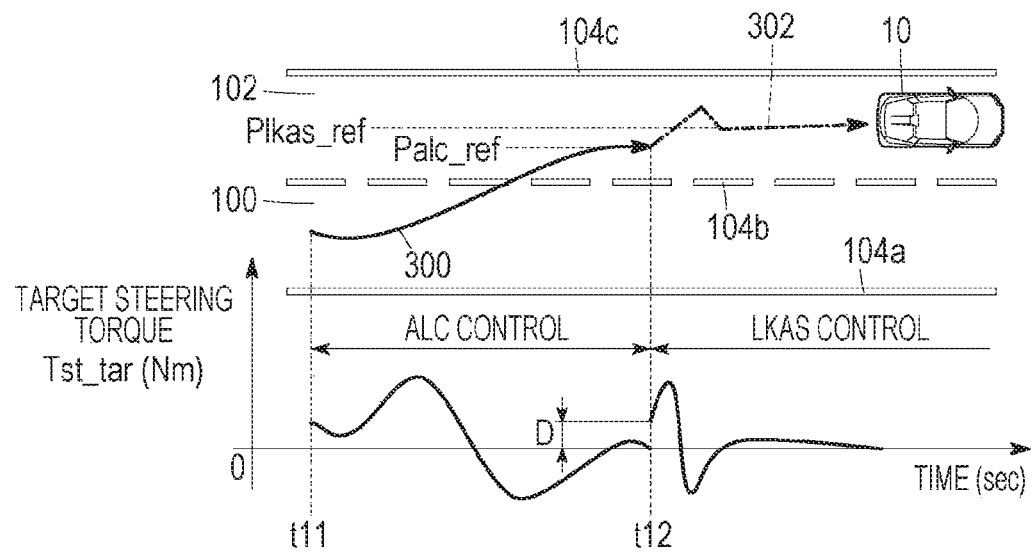
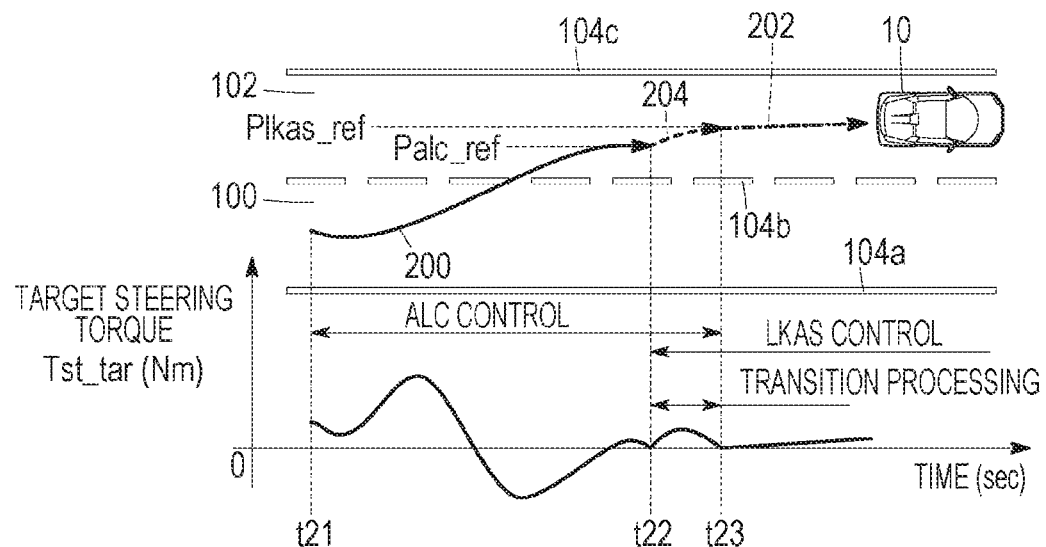

DRIVING CONTROL DEVICE

CROSS REFERENCES TO RELATED APPLICATIONS

The present application claims priority under 35 U.S.C. § 119 to Japanese Patent Application No. 2015-172100, filed Sep. 1, 2015, entitled "Driving Control Device." The contents of this application are incorporated herein by reference in their entirety.

TECHNICAL FIELD

The present disclosure relates to a driving control device that executes lane keeping control and lane change control.

BACKGROUND

Japanese Unexamined Patent Application Publication No. 2012-226392 attempts to provide a driving assistance system capable of appropriately assisting a driving operation when performing driving assistance based on images from plural cameras ([0006], Abstract).

In Japanese Unexamined Patent Application Publication No. 2012-226392 (Abstract), when operation of a direction indicator switch 9 is detected while lane keeping drive assistance is in progress, images from a second imaging unit 6 or a third imaging unit 7, capturing an area to the rear of the vehicle in the direction to which the direction indicator indicated, are used to recognize vehicles that would obstruct lane changing. When determination is made that no obstructing vehicles are present, a lane changing assistance unit 8 instructs a lane keeping assistance unit 2 to change the lane that should be kept to an adjacent lane in the direction to which the direction indicator indicated, and performs lane changing (S9 in FIG. 3, [0018]). When the lane changing has been completed (S10 in FIG. 3: YES), the direction indicator switch 9 resets and lane changing processing is ended, and lane keeping is continued (S11, [0018], [0022]).

As described above, in Japanese Unexamined Patent Application Publication No. 2012-226392, lane changing is executed when the direction indicator switch 9 is operated (in other words, when the driver instructs a lane change) while lane keeping drive assistance is in progress. When lane changing has been completed, the direction indicator switch 9 resets and the lane changing processing is ended. Japanese Unexamined Patent Application Publication No. 2012-226392 does not go into detail about restarting lane keeping drive assistance (lane keeping control) after lane changing has been completed.

Steering control to change lanes and steering control to keep in lane are performed separately. It is possible that, for example, the driver could feel unsettled if a divergence in steering torque were to arise when the control is switched.

SUMMARY

The present disclosure describes a driving control device capable of suppressing a driver from feeling unsettled when switching from automatic lane change control to lane keeping control.

A driving control device according to the present disclosure includes: a lane marking recognition section that recognizes a lane marking from a surroundings image captured by an imaging section; a lane keeping controller that performs lane keeping control for a vehicle according to a recognition result for the lane marking; a lane change controller that performs lane change control from a first lane to a second lane while the vehicle is driving; and a switching controller that controls switching between the lane change control and the lane keeping control. When performing a switch between the lane change control and the lane keeping control, the switching controller sets a transition time-frame for performing the switch, and gradually switches between the lane change control and the lane keeping control during the transition time-frame.

Accordingly, when switching between the lane change control and the lane keeping control, the transition time-frame for performing the switch is set, and the lane change control and the lane keeping control are gradually switched during the transition time-frame. Accordingly, a divergence in a control amount of the vehicle (such as steering torque) is less likely to arise when switching between the lane change control and the lane keeping control. Accordingly, such a divergence can be prevented from unsettling the driver or passengers.

During the transition time-frame, the switching controller may execute both the lane change control and the lane keeping control. In addition, the switching controller may decrease the ratio of a control amount of the vehicle by one out of the lane change control or the lane keeping control, and increase a ratio of the control amount by the other out of the lane change control or the lane keeping control. This thereby enables smooth switching between the lane change control and the lane keeping control.

The lane change controller may set a first target location or a first target region in the second lane when changing from the first lane to the second lane. Moreover, the lane change controller may compute a first lane change target torque, this being a target steering torque to make the vehicle reach the first target location or the first target region, as the control amount. In addition, the lane change controller may, after the vehicle has reached the first target location or the first target region, and until the transition time-frame elapses, continue to compute the first lane change target torque or a second lane change target torque, this being a target steering torque to make the vehicle reach a second target location or a second target region, as the control amount. After the vehicle has reached the first target location or the first target region, the lane keeping controller may compute a lane keeping target torque, this being a target steering torque to keep the vehicle driving within the second lane, as the control amount. During the transition time-frame, the switching controller may gradually exclude the first lane change target torque or the second lane change target torque, and gradually introduce the lane keeping target torque.

A divergence in the steering torque is accordingly less likely to arise when switching between the lane change control and the lane keeping control. Accordingly, such a divergence can be prevented from unsettling the driver or passengers.

During the transition time-frame, after the start of the transition time-frame, the switching controller may gradually increase an absolute value of a time derivative value of a decreasing ratio of the control amount by one out of the lane change control or the lane keeping control and an absolute value of a time derivative value of an increasing ratio of the control amount by the other out of the lane change control or the lane keeping control. Then, as the end of the transition time-frame approaches, the switching controller may gradually decrease the absolute value of the time derivative value of the decreasing ratio of the control amount by the one out of the lane change control or the lane keeping control and the absolute value of the time derivative value of the increasing ratio of the control amount by the other out of the lane change control or the lane keeping control. The rate of switching between the lane change control and the lane keeping control is accordingly low at the start of switching and at the end of switching, making it easier to prevent the driver and the like from feeling unsettled due to the switching.

BRIEF DESCRIPTION OF THE DRAWINGS

The advantages of the disclosure will become apparent in the following description taken in conjunction with the following drawings.

FIG. 5 is a flowchart of computation of a target ALC torque by a target ALC torque computation section of the present embodiment.

FIG. 6 is a flowchart of computation of a target steering torque by a target steering torque adjust section of the present embodiment.

FIG. 8A is a diagram illustrating a relationship between automatic lane change (ALC) control and lane keeping assist system (LKAS) control in a comparative example, in which transition processing is not employed.

FIG. 8B is a diagram illustrating a relationship between ALC control and LKAS control in the present embodiment, in which transition processing is employed.

DETAILED DESCRIPTION

A. First Embodiment
A1. Configuration
A1-1. Overall Configuration

Figure 1:
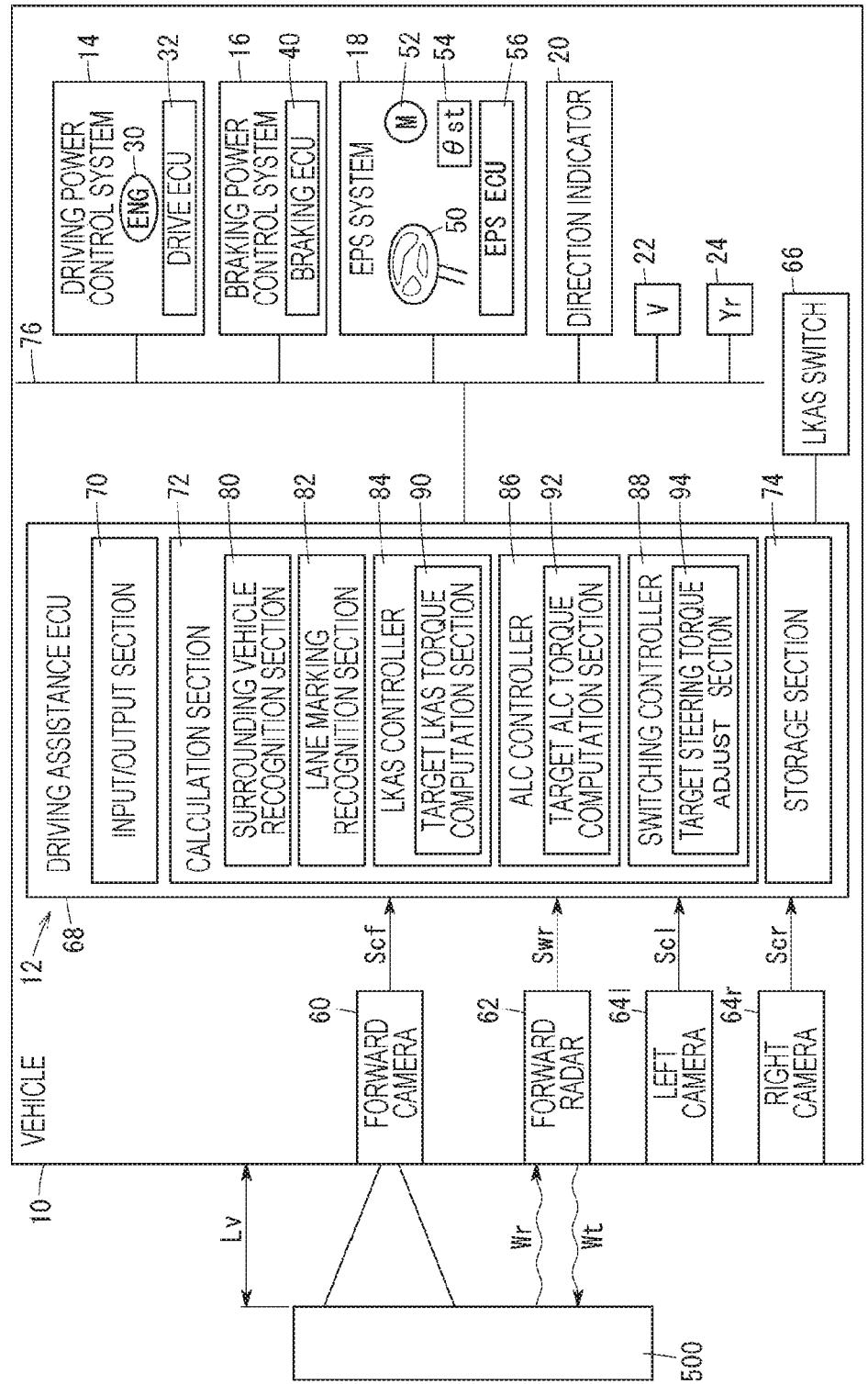
FIG. 1 is a block diagram illustrating configuration of a vehicle installed with a driving assistance system provided with a driving assistance electronic control unit serving as a driving control device according to an embodiment of the present disclosure.

FIG. 1 is a block diagram illustrating a configuration of a vehicle 10 installed with a driving assistance system 12 provided with a driving assistance electronic control unit 68 (referred to as a "driving assistance ECU 68" or an "ECU 68" below) serving as a driving control device according to an embodiment of the present disclosure. In addition to the driving assistance system 12, the vehicle 10 also includes a drive power control system 14, a braking power control system 16, an electrical power steering system 18 (referred to as an "EPS system 18" below), a direction indicator 20, a vehicle speed sensor 22, and a yaw rate sensor 24.

The driving assistance system 12 detects various surrounding objects 500 that appear around the vehicle 10 (for example, surrounding vehicles, pedestrians, and walls (none of which are illustrated)), and lane markings 104a, 104b, 104c (FIG. 8B). The driving assistance system 12 then uses the surrounding objects 500 and the lane markings 104a, 104b, 104c to assist driving of the vehicle 10.

The drive power control system 14 includes an engine 30 (drive source) and a drive electronic control unit 32 (referred to as a "drive ECU 32" below). The drive ECU 32 executes drive power control of the vehicle 10. In the drive power control, the drive ECU 32 controls the engine 30 so as to control the drive power of the vehicle 10. The drive power control of the present embodiment includes automatic cruise control. Automatic cruise control is control that causes the vehicle 10 to drive such that a vehicle speed V (km/h) matches a target vehicle speed Vtar.

A braking electronic control unit 40 (referred to as a "braking ECU 40" below) of the braking power control system 16 executes control of the braking power of the vehicle 10. In the braking power control, the braking ECU 40 controls the braking power of the vehicle 10 by controlling a non-illustrated brake mechanism or the like.

The EPS system 18 includes a steering wheel 50, an EPS motor 52, a steering angle sensor 54, and an EPS electronic control unit 56 (referred to as an "EPS ECU 56" or an "ECU 56" below). The EPS motor 52 is connected anywhere between the steering wheel 50 and a vehicle wheel, not illustrated in the drawings, and applies steering assist power. The steering angle sensor 54 detects a steering angle θst of the steering wheel 50. The EPS ECU 56 executes steering assist control. In the steering assist control, the EPS ECU 56 controls configuration elements of an electric power steering device (the EPS motor 52, the steering angle sensor 54, a torque sensor (not illustrated in the drawings) and the like) so as to assist steering by the driver.

The direction indicator 20 is a switch (winker switch) disposed in the vicinity of the steering wheel 50, and causes direction indicator lamps on the left side (left-turn direction) and the right side (right-turn direction) to flash on and off based on driver operation. The vehicle speed sensor 22 detects the vehicle speed V of the vehicle 10 and outputs this to the driving assistance system 12 and the like. The yaw rate sensor 24 detects a yaw rate Yr of the vehicle 10 and outputs this to the driving assistance system 12 and the like.

A1-2. Driving Assistance System 12

As illustrated in FIG. 1, in addition to the driving assistance ECU 68, the driving assistance system 12 includes a forward camera 60, a forward radar 62, side cameras 64l, 64r, and an LKAS switch 66 (LKAS: Lane Keeping Assist System).

A1-2-1. Forward Camera 60

The forward camera 60 (also referred to as a "camera 60" below), serving as an imaging section, acquires images Icf (also referred to as "forward images Icf" below) of an area to the front of the vehicle 10. Signals corresponding to the images Icf (referred to as "image signals Scf" or "signals Scf" below) are then output to the ECU 68. Detected objects 500 detected by the forward camera 60 are also referred to as "camera targets 500c" below.

Although a single forward camera 60 is employed in the present embodiment, a stereo camera may be configured by disposing two forward cameras 60 with left-right symmetry to each other. The forward camera 60 acquires the images Icf at 15 frames or more (for example, 30 frames) per second. Although the forward camera 60 is a monochrome camera that primarily uses light having a wavelength in the visible spectrum, a color camera or an infra-red camera may be employed. The forward camera 60 is, for example, disposed at a vehicle width direction central portion of a front section in the vehicle cabin of the vehicle 10 (for example, in the vicinity of the rear view mirror). Alternatively, the forward camera 60 may be disposed at a vehicle width direction central portion of a front bumper section of the vehicle 10.

A-1-2-2. Forward Radar 62

The forward radar 62 (also referred to as a "radar 62" below) outputs transmitted waves Wt, which are electromagnetic waves (millimeter waves here), to the exterior of the vehicle 10, and receives reflected waves Wr that are waves out of the transmitted waves Wt reflected back by the detected objects 500 (including, for example, surrounding vehicles and pedestrians). Detection signals corresponding to the reflected waves Wr (referred to as "reflected wave signals Swr" or "signals Swr" below) are output to the ECU 68. The signals Swr include information Ir acquired by the radar 62 (also referred to as "radar information Ir" below). The detected objects 500 detected by the radar 62 are also referred to as "radar targets 500r" below.

The radar 62 is disposed at the front side of the vehicle 10 (for example, on a front bumper and/or a front grill). In addition to the front side, or instead of the front side, the radar 62 may be disposed at the rear side (for example, on a rear bumper and/or a rear grill) or at a side (for example, on a lateral side of the front bumper) of the vehicle 10. A sensor such as a laser radar or an ultrasonic wave sensor may be employed instead of the radar 62 that outputs millimeter waves.

The distance to a detected object 500, the type of detected object 500, and the like can be found using at least one out of the camera target 500c detected by the forward camera 60 or the radar target 500r detected by the radar 62.

A-1-2-3. Side Cameras 64l, 64r

The side cameras 64l, 64r (also referred to as the "cameras 64l, 64r" or the "left camera 64l" and the "right camera 64r" below), serving as an imaging section, acquire images Icl, Icr (also referred to as the "side images Icl, Icr" or the "left image Icl" and the "right image Icr" below) from the sides of the vehicle 10. Namely, the left camera 64l images an area on the left side of the vehicle 10, and the right camera 64r images an area on the right side of the vehicle 10. The cameras 64l, 64r output signals (referred to as "image signals Scl" or "image signals Scr" below) corresponding to the images Icl, Icr to the ECU 68. Information acquired by the forward camera 60 and the side cameras 64l, 64r is also referred to as "camera information Ic" below. The forward image Icf, the left image Icl, and the right image Icr are also referred to as "surroundings images Ica" below.

In the present embodiment, cameras with similar specifications or different specifications to the forward camera 60 may be employed as the side cameras 64l, 64r. The side cameras 64l, 64r are, for example, disposed at the sides of the vehicle 10 (for example, in the vicinity of wing mirrors).

A-1-2-4. LKAS Switch 66

The LKAS switch 66 is a switch with which the driver instructs the driving assistance ECU 68 to execute Lane Keeping Assist System control (LKAS control), described later. Another method (such as audio input using a non-illustrated microphone) may be employed to instruct LKAS control in addition to, or instead of, the LKAS switch 66.

A-1-2-5. Driving Assistance ECU 68

The driving assistance ECU 68 controls the overall driving assistance system 12, and, as illustrated in FIG. 1, includes an input/output section 70, a calculation section 72, and a storage section 74.

The image signals Scf, Scl, Scr from the cameras 60, 64l, 64r, and the reflected wave signals Swr from the radar 62 are supplied to the driving assistance ECU 68 via the input/output section 70. Communication between the driving assistance ECU 68 and the drive ECU 32, the braking ECU 40, and the EPS ECU 56, is performed via the input/output section 70 and communication lines 76. The input/output section 70 includes a non-illustrated A/D converter circuit that converts input analog signals into digital signals.

The calculation section 72 makes calculations based on the respective signals Scf, Scl, Scr, Swr from the cameras 60, 64l, 64r and the radar 62, signals from the direction indicator 20, the vehicle speed V from the vehicle speed sensor 22, and the yaw rate Yr from the yaw rate sensor 24. Based on the calculation results, the calculation section 72 generates signals for the drive ECU 32, the braking ECU 40, and the EPS ECU 56.

As illustrated in FIG. 1, the calculation section 72 includes a surrounding vehicle recognition section 80, a lane marking recognition section 82, an LKAS controller 84, an ALC controller 86 (ALC: Automatic Lane Change), and a switching controller 88. These respective sections are implemented by executing a program stored in the storage section 74 by a processor or CPU. The program may be supplied from an external source via a non-illustrated wireless communication device (such as a mobile phone, or a smartphone). Some of the program may also be configured using hardware (circuit components).

The surrounding vehicle recognition section 80 recognizes surrounding vehicles based on the camera information Ic from the cameras 60, 64l, 64r and the radar information Ir from the radar 62, and outputs information Iav (also referred to as "surrounding vehicle information Iav" below) relating to the surrounding vehicles. The lane marking recognition section 82 recognizes the lane markings 104a, 104b, 104c (FIG. 8B) based on the camera information Ic (surroundings images Ica) from the cameras 60, 64l, 64r, and outputs information Ilm (also referred to as "lane marking information Ilm" below) relating to the lane markings 104a, 104b, 104c.

The LKAS controller 84 (lane keeping controller) performs Lane Keeping Assist System control (LKAS control) of the vehicle 10 based on the surrounding vehicle information Iav from the surrounding vehicle recognition section 80, and the lane marking information Ilm from the lane marking recognition section 82.

As illustrated in FIG. 1, the LKAS controller 84 includes a target LKAS torque computation section 90 (also referred to as the "computation section 90" below). The computation section 90 computes a torque target value (referred to as the "target LKAS torque Tlkas_tar" or the "target torque Tlkas_tar" below), which is required in LKAS control, of the EPS motor 52.

The ALC controller 86 (lane change controller) performs Automatic Lane Change control (ALC control) of the vehicle 10 based on the surrounding vehicle information Iav from the surrounding vehicle recognition section 80, and the lane marking information Ilm from the lane marking recognition section 82.

As illustrated in FIG. 1, the ALC controller 86 includes a target ALC torque computation section 92 (also referred to as the "computation section 92" below). The computation section 92 computes a torque target value (referred to as the "target ALC torque Talc_tar" or the "target torque Talc_tar" below), which is required in ALC control, of the EPS motor 52.

The switching controller 88 executes transition processing to transition between LKAS control and ALC control (or switching processing to switch between LKAS control and ALC control). As illustrated in FIG. 1, the switching controller 88 includes a target steering torque adjust section 94 (also referred to as the "adjust section 94" below). During transition processing, the adjust section 94 computes a torque target value (referred to as the "target steering torque Tst_tar" or the "target torque Tst_tar" below) of the EPS motor 52.

The storage section 74 is configured by, for example, random access memory (RAM) that stores imaging signals that have been converted into digital signals, temporary data entailed by various types of calculation processing, and the like, and read only memory (ROM) that stores executable programs, tables, plots, and the like.

A2. Various Control

A2-1. Overview

As described above, the LKAS controller 84 of the present embodiment executes LKAS control. The LKAS control is control to keep the vehicle 10 at a reference position Plkas_ref within a driving lane 100 (FIG. 8B). Note that the reference position Plkas_ref indicates a width direction position in the driving lane 100. A reference line is formed by extending the reference position Plkas_ref along the direction of travel of the vehicle 10.

The ALC controller 86 executes ALC control. The ALC control is control to automatically move the vehicle 10 to a lane 102 on a side indicated by the direction indicator 20 (on the left side or right side) with respect to the driving lane 100 of the vehicle 10. The switching controller 88 of the present embodiment executes transition processing to transition between the LKAS control and the ALC control (in other words, switching processing to switch between the LKAS control and the ALC control).

A2-2. LKAS Control

In the LKAS control, the burden of driving is alleviated by assisting operation of the steering wheel 50 so as to drive along the reference line formed from the reference position Plkas_ref of the driving lane 100. In order to achieve this, the LKAS controller 84 controls drive power of the vehicle 10 using the engine 30, and controls the steering angle θst of the steering wheel 50 using the EPS motor 52. Namely, the LKAS controller 84 outputs engine 30 output instructions to the drive ECU 32, and outputs steering angle θst instructions to the EPS ECU 56, such that the vehicle 10 drives at the reference position Plkas_ref of the driving lane 100. The LKAS control may be employed in combination with the automatic cruise control described above.

The reference position Plkas_ref of the present embodiment is a point on a center line of the driving lane 100. Alternatively, the reference position Plkas_ref may be set at a position offset from the center line by a specific distance in the width direction.

A2-3. ALC Control

The ALC control moves the vehicle 10 automatically to the lane 102 on the side of the driving lane 100 of the vehicle 10 indicated by the direction indicator 20 (on the left side or right side). In order to achieve this, the ALC controller 86 controls the drive power of the vehicle 10 using the drive ECU 32, and controls the steering angle θst using the EPS ECU 56.

A2-4. Overall Flow

Figure 2:
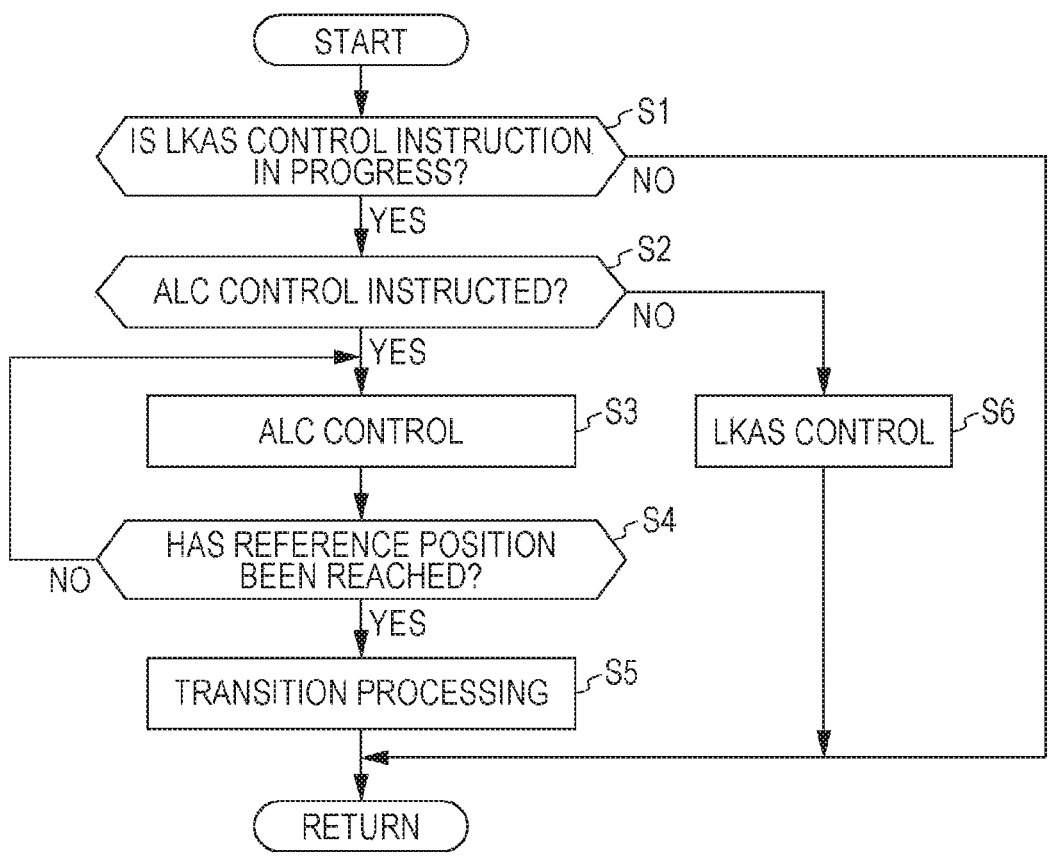
FIG. 2 is a flowchart of switching between different types of control in the present embodiment.

FIG. 2 is a flowchart of switching between different types of control in the present embodiment. Each of the steps S1 to S6 in FIG. 2 is performed by the driving assistance ECU 68 (primarily by the switching controller 88). At step S1, the switching controller 88 determines whether or not an LKAS control instruction is in progress. For example, the switching controller 88 determines that an LKAS control instruction is in progress in cases in which the LKAS switch 66 is ON. Alternatively, the switching controller 88 may determine that an LKAS control instruction by audio input is in progress. Processing proceeds to step S2 when LKAS control instruction is in progress (S1: YES).

At step S2, the switching controller 88 determines whether or not an ALC control instruction has been input. For example, the switching controller 88 determines that an ALC control instruction has been input in cases in which the direction indicator 20 has been operated in a left turn direction or a right turn direction in a state in which the LKAS switch 66 is ON. Alternatively, the switching controller 88 may determine that an ALC control instruction has been input in cases in which the driver has input a rotation operation to the steering wheel 50 in a state in which the LKAS switch 66 is ON.

When an ALC control instruction has been input (S2: YES), at step S3, the ALC controller 86 executes the ALC control. Specific contents thereof will be described in detail later, with reference to FIG. 5. Note that at step S3, if a moving vehicle is present in the lane 102 in the direction instructed by the direction indicator 20, the step S3 may further includes a condition that the moving vehicle is in a position that will not obstruct lane changing. At step S4, the ALC controller 86 determines whether or not a reference position Palc_ref (also referred to as the "ALC reference position Palc_ref") (FIG. 8B), employed during lane changing by the vehicle 10, has been reached.

Processing returns to step S3 when the reference position Palc_ref has not been reached (S4: NO). When the reference position Palc_ref has been reached (S4: YES), at step S5, the LKAS controller 84, the ALC controller 86, and the switching controller 88 execute transition processing. Specifically, the LKAS controller 84 executes LKAS control and outputs a control amount u of the vehicle 10 to the switching controller 88. In the control amount u, content relating specifically to the LKAS control is referred to as a control amount u1. The control amount u1 includes, for example, the target LKAS torque Tlkas_tar of the EPS motor 52. The ALC controller 86 also executes ALC control and outputs a control amount u of the vehicle 10 to the switching controller 88. In the control amount u, content relating specifically to the ALC control is referred to as a control amount u2. The control amount u2 includes, for example, the target ALC torque Talc_tar of the EPS motor 52.

The switching controller 88 combines the control amount u1 from the LKAS controller 84 and the control amount u2 from the ALC controller 86, and switches between the ALC control and the LKAS control (described in detail later with reference to FIG. 3, FIG. 6, FIG. 7A, FIG. 7B, and FIG. 8B).

Returning to step S2 in FIG. 2, in cases in which an ALC control instruction has not been input (S2: NO), at step S6, the LKAS controller 84 executes LKAS control. Specific contents thereof will be described in detail later, with reference to FIG. 4.

Returning to step S1, in cases in which LKAS control instruction is not in progress (S1: NO), the driving assistance ECU 68 ends the current processing, and repeats step S1 after a specific amount of time has elapsed.

2-5. Switching Between LKAS Control and ALC Control (Target Steering Torque Tst_tar Control)

2-5-1. Overview

Next, explanation follows regarding the target steering torque Tst_tar when switching between the LKAS control and the ALC control.

Figure 3:
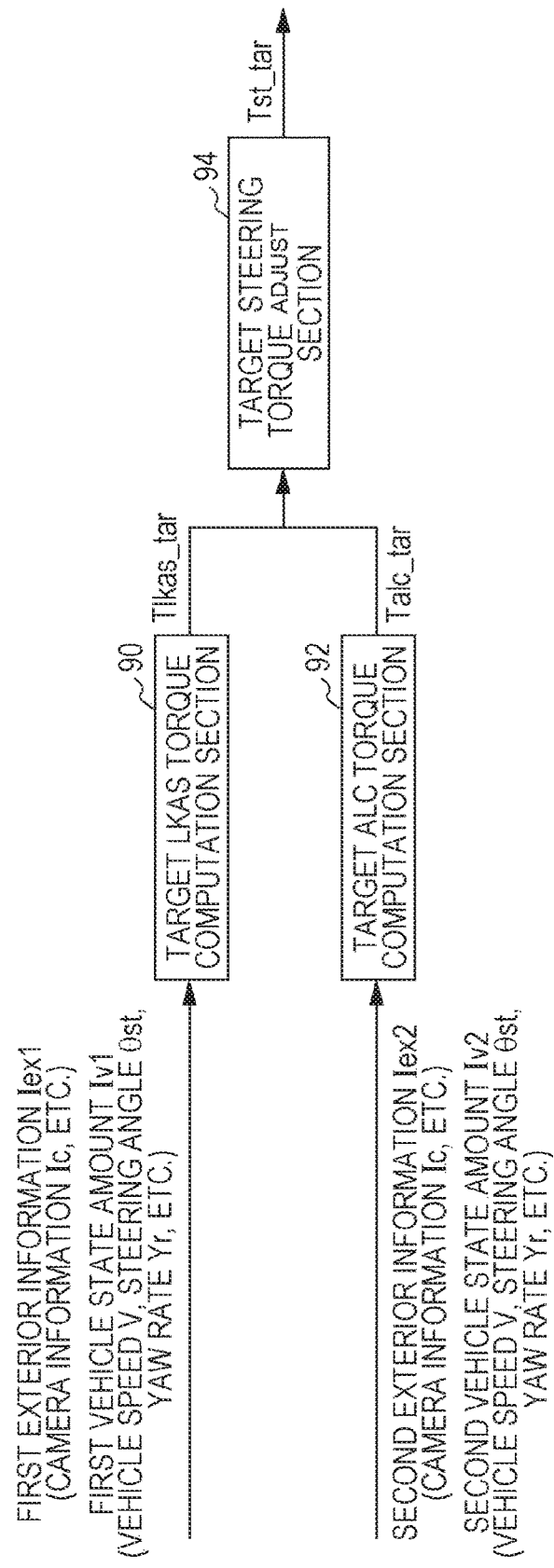
FIG. 3 is a block diagram illustrating computation of a target steering torque in the present embodiment.

FIG. 3 is a block diagram illustrating computation of the target steering torque Tst_tar in the present embodiment. As illustrated in FIG. 3, the target LKAS torque computation section 90 of the LKAS controller 84 computes the target LKAS torque Tlkas_tar based on first exterior information Iex1 and a first vehicle state amount Iv1. The target ALC torque computation section 92 of the ALC controller 86 computes the target ALC torque Talc_tar based on second exterior information Iex2 and a second vehicle state amount Iv2.

The target steering torque adjust section 94 selectively employs either one or both out of the target LKAS torque Tlkas_tar and the target ALC torque Talc_tar, according to the current control type.

For example, when LKAS control is selected (S6 in FIG. 2), the adjust section 94 employs only the target LKAS torque Tlkas_tar. In such cases, the target ALC torque Talc_tar is not employed. When ALC control is selected (S3 in FIG. 2), the adjust section 94 employs only the target ALC torque Talc_tar. In such cases, the target LKAS torque Tlkas_tar is not employed. When transition processing is selected (S5 in FIG. 2), the adjust section 94 switches between the ALC control and the LKAS control, while varying respective ratios Rlkas, Ralc of the target LKAS torque Tlkas_tar and the target ALC torque Talc_tar.

2-5-2. Target LKAS Torque Tlkas_tar Computation

Figure 4:
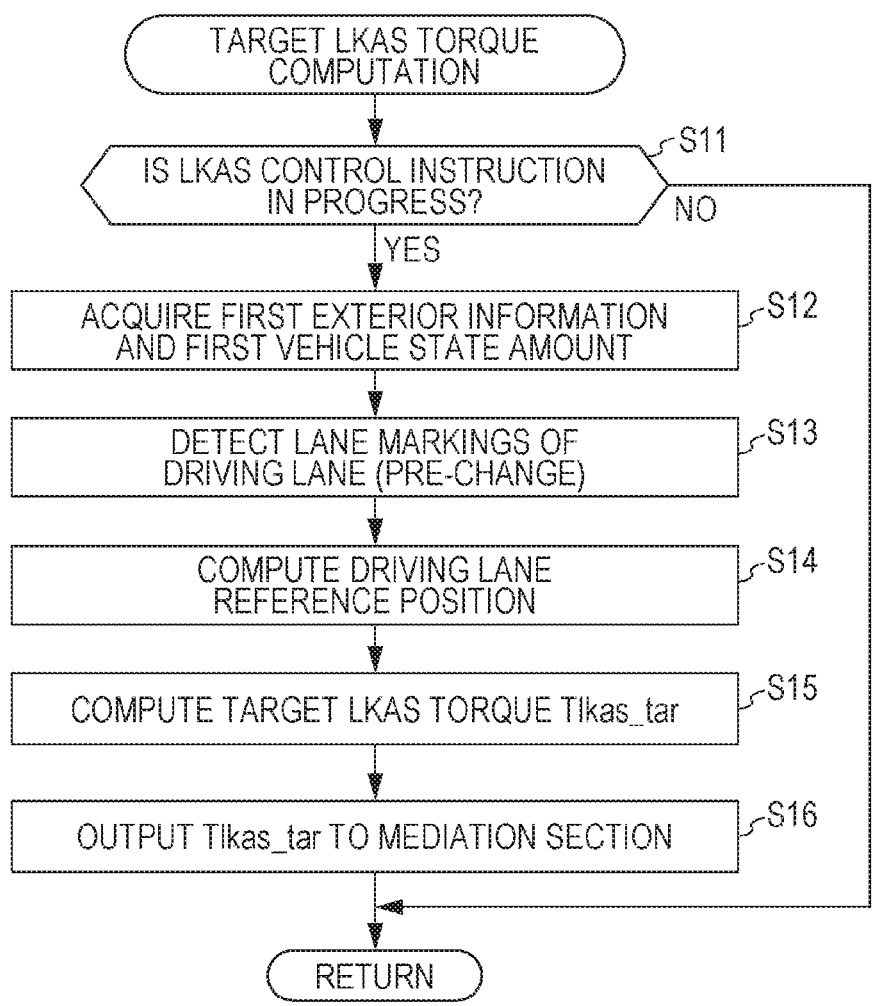
FIG. 4 is a flowchart of computation of a target LKAS torque by a target LKAS torque computation section of the present embodiment.

FIG. 4 is a flowchart of computation of the target LKAS torque Tlkas_tar by the target LKAS torque computation section 90 in the present embodiment. The processing in FIG. 4 is repeated at a specific calculation cycle (LKAS calculation cycle). At step S11, the computation section 90 determines whether or not an LKAS control instruction is in progress. This determination is similar to that of step S1 in FIG. 2.

At step S12, the computation section 90 acquires the first exterior information Iex1 and the first vehicle state amount Iv1. The first exterior information Iex1 Includes, for example, the camera information Ic. The first vehicle state amount Iv1 includes, for example, the vehicle speed V, the steering angle θst, and the yaw rate Yr.

At step S13, the computation section 90 detects the left and right lane markings 104a, 104b defining the driving lane 100 of the vehicle 10 (see FIG. 8B). At step S14, the computation section 90 computes the LKAS reference position Plkas_ref of the driving lane 100 (also referred to as the "pre-change lane 100" below) based on the left and right lane markings 104a, 104b.

At step S15, the computation section 90 computes the target LKAS torque Tlkas_tar to drive the vehicle 10 at the reference position Plkas_ref at the vehicle speed V. At step S16, the computation section 90 outputs the target LKAS torque Tlkas_tar to the adjust section 94.

2-5-3. Target ALC Torque Talc_tar Computation

FIG. 5 is a flowchart of computation of the target ALC torque Talc_tar by the target ALC torque computation section 92 in the present embodiment. The processing in FIG. 5 is repeated at a specific calculation cycle (ALC calculation cycle). At step S21, the computation section 92 determines whether or not an ALC control instruction has been input. This determination is similar to that of step S2 in FIG. 2. Processing proceeds to step S22 when an ALC control instruction has been input (S1: YES).

At step S22, the computation section 92 acquires the second exterior information Iex2 and the second vehicle state amount Iv2. The second exterior information Iex2 includes, for example, the camera information Ic. The second vehicle state amount Iv2 includes, for example, the vehicle speed V, the steering angle θst, and the yaw rate Yr.

At step S23, the computation section 92 detects the left and right lane markings 104b, 104c defining the other lane 102 (also referred to as the "target lane 102" or the "post-change lane 102" below) indicated by the direction indicator 20 (see FIG. 8B). At step S24, the computation section 92 computes the ALC reference position Palc_ref of the target lane 102 based on the left and right lane markings 104b, 104c.

The reference position Palc_ref may differ from the LKAS reference position Plkas_ref, for example if the ALC reference position Palc_ref is set further to the driving lane 100 (pre-change lane 100) side than the LKAS reference position Plkas_ref. More specifically, the reference position Palc_ref is set at a position a specific distance from the center of the target lane 102 toward the pre-change lane 100. Alternatively, the reference position Palc_ref may be set at a position a specific distance from the right side lane marking 104b of the target lane 102 toward the center of the target lane 102.

At step S25, the computation section 92 computes the target ALC torque Talc_tar to move the vehicle 10 to the ALC reference position Palc_ref of the target lane 102. At step S26, the computation section 92 outputs the target ALC torque Talc_tar to the adjust section 94.

At step S27, the ALC controller 86 determines whether or not the vehicle 10 has reached the ALC reference position Palc_ref. Processing returns to step S22 when the reference position Palc_ref has not been reached (S27: NO). Processing proceeds to step S28 when the reference position Palc_ref has been reached (S27: YES).

At step S28, the ALC controller 86 increments a count value CNT by one. The count value CNT is a numerical value for determining a transition time-frame Ttra in which to perform transition processing. At step S29, the ALC controller 86 executes steps S23 to S26. Namely, the ALC controller 86 detects the left and right lane markings 104b, 104c defining the target lane 102 (S23), computes the ALC reference position Palc_ref (S24), computes the target ALC torque Talc_tar (S25), and outputs the target ALC torque Talc_tar to the adjust section 94 (S26).

In the present embodiment, the ALC reference position Palc_ref (second ALC reference position Palc_ref2) at step S29 is the same as the reference position Palc_ref (first ALC reference position Palc_ref1) at step S24. Alternatively, the second ALC reference position Palc_ref2 may differ from the first ALC reference position Palc_ref1.

For example, the second ALC reference position Palc_ref2 may be positioned further to the center side of the target lane 102 than the first ALC reference position Palc_ref1. In other words, a final ALC reference position Palc_ref may be set as the second ALC reference position Palc_ref2, and the first ALC reference position Palc_ref1 may be located en-route to the second ALC reference position Palc_ref2. In such cases, a target ALC torque Talc_tar (second lane change target torque) for the second ALC reference position Palc_ref2 is set separately to the target ALC torque Talc_tar (first lane change target torque) for the first ALC reference position Palc_ref1.

At step S30, the ALC controller 86 determines whether or not the count value CNT is a threshold value THcnt or greater. The threshold value THcnt is set to a value corresponding to the transition time-frame Ttra. Processing returns to step S28 when the count value CNT is not the threshold value THcnt or greater (S30: NO). The current processing ends when the count value CNT is the threshold value THcnt or greater (S30: YES).

2-5-4. Target Steering Torque Tst_tar Computation
2-5-4-1. Overall Flow

FIG. 6 is a flowchart of computation of the target steering torque Tst_tar by the target steering torque adjust section 94 of the present embodiment. The processing in FIG. 6 is repeated at a specific calculation cycle (target steering torque calculation cycle). At step S41, the adjust section 94 receives the target LKAS torque Tlkas_tar from the computation section 90, and receives the target ALC torque Talc_tar from the computation section 92. Note that when LKAS control is not in progress, the target LKAS torque Tlkas_tar cannot be received, or has a value of zero. When ALC control is not in progress, the target ALC torque Talc_tar cannot be received, or has a value of zero.

At step S42, the adjust section 94 determines whether or not automatic lane change is in progress, and whether or not the vehicle 10 is yet to reach the ALC reference position Palc_ref. Processing proceeds to step S43 when automatic lane change is in progress, and the vehicle 10 is yet to reach the ALC reference position Palc_ref (S42: YES).

At step S43, the adjust section 94 sets the target ALC torque Talc_tar as the target steering torque Tst_tar (Tst_tar ← Talc_tar). When this is performed, the target LKAS torque Tlkas_tar is not reflected in the target steering torque Tst_tar. Accordingly, the target steering torque Tst_tar reflects only the ALC control.

However, processing proceeds to step S44 when automatic lane change is not in progress or the vehicle 10 has already reached the ALC reference position Palc_ref (S42: NO). At step S44, the adjust section 94 determines whether or not automatic lane change is in progress, and whether or not the vehicle 10 has already reached the ALC reference position Palc_ref. Processing proceeds to step S45 when automatic lane change is in progress and the vehicle 10 has already reached the ALC reference position Palc_ref (S44: YES).

At step S45, the adjust section 94 executes transition processing to switch between the ALC control and the LKAS control. The transition processing is described later, with reference to FIG. 7A, FIG. 7B, and FIG. 8B.

However, when automatic lane change is not in progress (S44: NO), at step S46, the adjust section 94 sets the target LKAS torque Tlkas_tar as the target steering torque Tst_tar (Tst_tar ← Tlkas_tar). When this is performed, the target ALC torque Talc_tar is not reflected in the target steering torque Tst_tar. Accordingly, the target steering torque Tst_tar reflects only the LKAS control.

2-5-4-2. Transition Processing

The transition processing is processing to switch between the ALC control and the LKAS control. In the transition processing of the present embodiment, the control amount u1 by the LKAS control (target LKAS torque Tlkas_tar) is gradually increased, while gradually reducing the control amount u2 by the ALC control (target ALC torque Talc_tar). In other words, the ALC control continues for a short time even when LKAS control has been started or restarted. This thereby enables control transition to be performed smoothly.

Figure 7A:
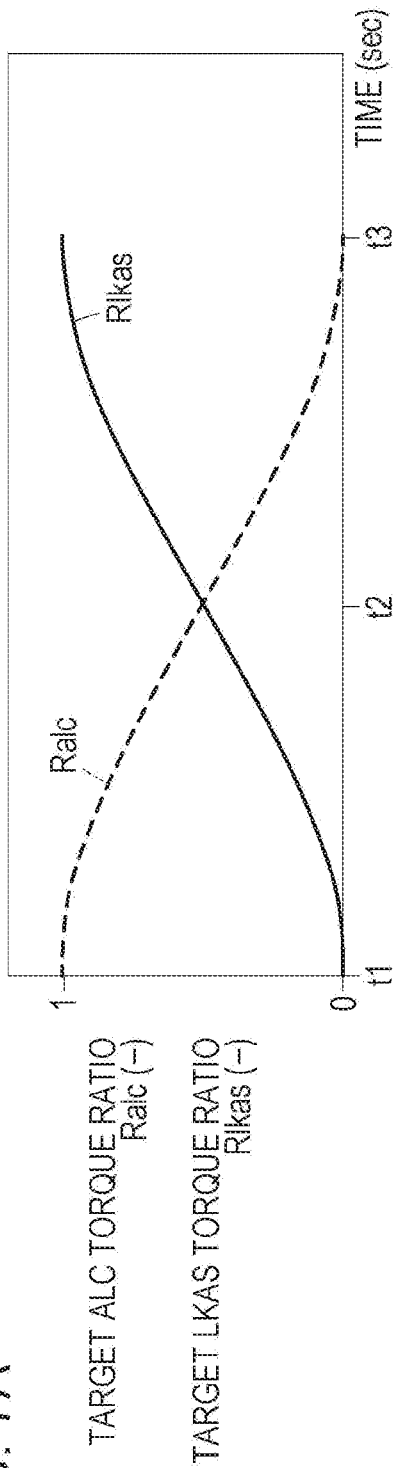
FIG. 7A is a first graph to explain transition processing of the present embodiment.
Figure 7B:
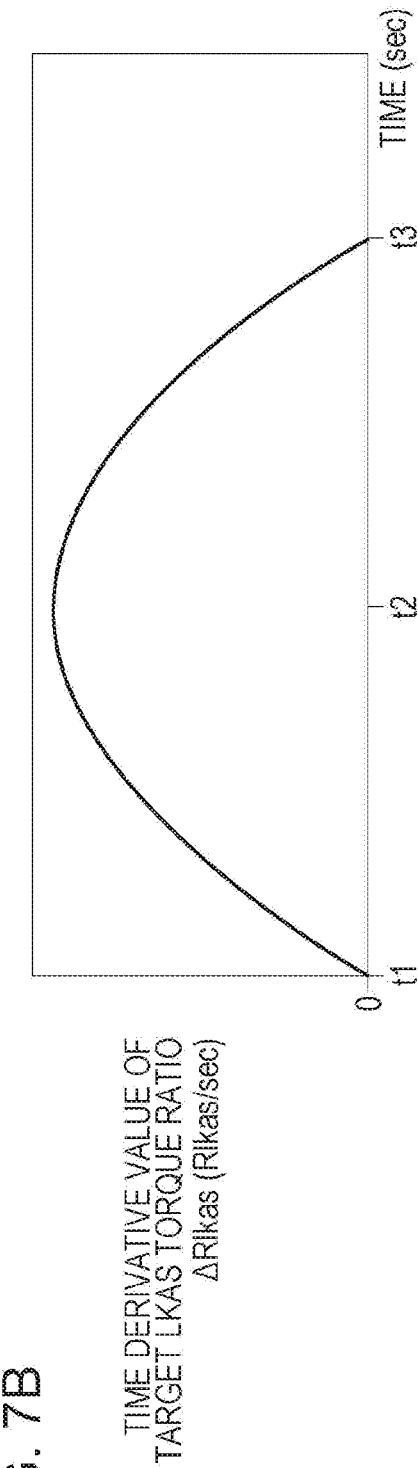
FIG. 7B is a second graph to explain transition processing of the present embodiment.

FIG. 7A and FIG. 7B are a first graph and a second graph to explain the transition processing of the present embodiment. Specifically, FIG. 7A is a graph illustrating changes in the ratio Ralc of the target ALC torque Talc_tar and the ratio Rlkas of the target LKAS torque Tlkas_tar during the transition processing of the present embodiment. In FIG. 7A, the horizontal axis shows time (sec), and the vertical axis shows the ratio Ralc (-) of the target ALC torque Talc_tar and the ratio Rlkas (-) of the target LKAS torque Tlkas_tar. FIG. 7B is a graph illustrating a time derivative value ΔRlkas of the ratio Rlkas of the target LKAS torque Tlkas_tar during the transition processing of the present embodiment. In FIG. 7B, the horizontal axis shows time (sec), and the vertical axis shows the time derivative value ΔRlkas (Rlkas/sec) of the ratio Rlkas of the target LKAS torque Tlkas_tar. The horizontal axis is common between FIG. 7A and FIG. 7B.

As illustrated in FIG. 7A, the ratio Ralc of the target ALC torque Talc_tar is gradually decreased from 1 at a timing t1 to 0 at a timing t3 (monotonic decrease). Meanwhile, the ratio Rlkas of the target LKAS torque Tlkas_tar is gradually increased from 0 at the timing t1 to 1 at the timing t3 (monotonic increase). From this, it is understood that in the present embodiment, the time-frame Ttra of the transition processing (transition time-frame Ttra) runs from the timing t1 to the timing t3. In the present embodiment, Ralc=1−Rlkas is satisfied. In other words, during the transition time-frame Ttra, Tst_tar=Tlkas_tar×Rlkas+Talc_tar×(1−Rlkas).

As illustrated in FIG. 7B, the time derivative value ΔRlkas of the ratio Rlkas of the target LKAS torque Tlkas_tar gradually increases from the transition processing start timing t1, and is at a maximum at a timing t2. The timing t2 is a timing halfway through the transition time-frame Ttra. After the timing t2, the time derivative value ΔRlkas gradually decreases to reach a minimum value (0 in this case) at the transition processing end timing t3. This thereby enables smooth switching between the target LKAS torque Tlkas_tar and the target ALC torque Talc_tar since the time derivative value ΔRlkas is 0 at the timings t1 and t3.

As described above, in the present embodiment, Ralc=1−Rlkas is satisfied. Accordingly, the absolute value of a time derivative value ΔRalc of the ratio Ralc of the target ALC torque Talc_tar is equal to the absolute value of the time derivative value ΔRlkas (|ΔRalc|=|ΔRlkas|).

A2-6. Comparison Between Present Embodiment and Comparative Example

FIG. 8A illustrates a relationship between ALC control and LKAS control in a comparative example in which transition processing is not employed. FIG. 8B illustrates a relationship between the ALC control and the LKAS control in the present embodiment, in which transition processing is employed.

In FIG. 8A and FIG. 8B, the horizontal axes show time, and the vertical axes show the course of the vehicle 10 and the target steering torque Tst_tar. FIG. 8A and FIG. 8B show the driving lane 100 (pre-change lane 100) and the target lane 102 (post-change lane 102). The driving lane 100 is defined by the lane markings 104a, 104b, and the target lane 102 is defined by the lane markings 104b, 104c. Note that FIG. 8A and FIG. 8B do not illustrate oncoming traffic lanes.

FIG. 8A and FIG. 8B also show the LKAS reference position Plkas_ref and the ALC reference position Palc_ref.

In FIG. 8A, the course 300 shown by a continuous line indicates the course of the vehicle 10 when performing ALC control. The course 302 shown by a dot-dash line indicates the course of the vehicle 10 when performing LKAS control. In FIG. 8B, the course 200 shown by a continuous line indicates the course of the vehicle 10 when performing only ALC control. The course 202 shown by a dot-dash line indicates the course of the vehicle 10 when performing only LKAS control. The course 204 indicated by an intermittent line indicates the course of the vehicle 10 when performing both ALC control and LKAS control (namely, during transition processing).

In the comparative example in FIG. 8A, the ALC control is performed from a timing t11 to a timing t12. When the vehicle 10 reaches the ALC reference position Palc_ref at the timing t12, the ALC control is ended, and the LKAS control begins. Since there is an immediate switch from the target ALC torque Talc_tar to the target LKAS torque Tlkas_tar, a large divergence D arises in the target steering torque Tst_tar. There is therefore a possibility that a sudden change in the steering torque Tst could unsettle the driver or other occupants.

In the present embodiment illustrated in FIG. 8B, the ALC control is started at a timing t21, and the vehicle 10 reaches the ALC reference position Palc_ref at a timing t22. At this timing, the driving assistance ECU 68 performs the transition processing to start the LKAS control while continuing the ALC control. When the ALC control ends at a timing t23 and the transition processing is completed, the driving assistance ECU 68 performs the LKAS control only. The divergence D in the target steering torque Tst_tar can accordingly be suppressed due to switching gradually from the target ALC torque Talc_tar to the target LKAS torque Tlkas_tar. This thereby enables a sudden change in the steering torque Tst to be prevented from unsettling the driver or other occupants.

A3. Advantageous Effects of the Present Embodiment

As described above, in the present embodiment, when switching between the ALC control and the LKAS control, the transition time-frame Ttra for performing the switch is set, and the ALC control and the LKAS control are gradually switched during the transition time-frame Ttra (FIG. 7A, FIG. 8B). Accordingly, the divergence D (FIG. 8A) between the control amounts u1, u2 (steering torque Tot and the like) of the vehicle 10 is less likely to arise when switching between the ALC control and the LKAS control. This thereby enables the divergence D to be prevented from unsettling the driver or passengers.

In the present embodiment, the switching controller 88 executes both the ALC control and the LKAS control during the transition time-frame Ttra (FIG. 7A, FIG. 8B). In addition, the switching controller 88 decreases the ratio Ralc of the control amount u2 (target ALC torque Talc_tar) of the vehicle 10 by the ALC control and increases the ratio Rlkas of the control amount u1 (target LKAS torque Tlkas_tar) by the LKAS control (FIG. 7A). This thereby enables smooth switching between the ALC control and the LKAS control.

In the present embodiment, the ALC controller 86 sets the ALC reference position Palc_ref (first target location) in the target lane 102 in order to change from the driving lane 100 (first lane) to the target lane 102 (second lane) (S24 in FIG. 5, FIG. 8B). The ALC controller 86 also computes the target ALC torque Talc_tar (first lane change target torque) to make the vehicle 10 reach the reference position Palc_ref as the control amount u2 (S25 in FIG. 5). Moreover, the ALC controller 86 continues to compute the target ALC torque Talc_tar as the control amount u2 after the vehicle 10 has reached the reference position Palc_ref (S27: YES), and until the transition time-frame Ttra has elapsed (S28 to S30). The LKAS controller 84 computes the target LKAS torque Tlkas_tar to keep the vehicle 10 driving within the target lane 102 as the control amount u1 after the vehicle 10 has reached the reference position Palc_ref (S15 in FIG. 4). The switching controller 88 gradually excludes the target ALC torque Talc_tar, and gradually introduces the target LKAS torque Tlkas_tar, during the transition time-frame Ttra (FIG. 7A, FIG. 8B).

The divergence D (FIG. 8A) in the steering torque Tst when switching between the ALC control and the LKAS control is accordingly less likely to occur. Accordingly, the divergence D can be prevented from unsettling the driver or passengers.

In the present embodiment, during the transition time-frame Ttra, after the start of the transition time-frame Ttra, the switching controller 88 gradually increases the absolute value of the time derivative value ΔRalc of the decreasing ratio Ralc of the target ALC torque Talc_tar (control amount u2), and gradually increases the absolute value of the time derivative value ΔRlkas of the increasing ratio Rlkas of the target LKAS torque Tlkas_tar (control amount u1). Then, as the end of the transition time-frame Ttra approaches, the switching controller 88 gradually decreases these absolute values (FIG. 7A, FIG. 7B). The rate of switching between the ALC control and the LKAS control is accordingly low at the start of switching and at the end of switching, making it easier to prevent the driver and the like from feeling unsettled due to the switching.

B. Modified Example

Note that the present disclosure is not limited by the embodiment above, and obviously various configurations may be adopted based on the material disclosed herein. For example, the following configuration may be adopted.

B1. Applicability

In the above exemplary embodiment, the driving assistance system 12 is applied to the vehicle 10 (FIG. 1). However, there is no limitation thereto, and application may be made in other fields. For example, the driving assistance system 12 may be applied to a robot. In such cases, a moving object ahead may take the place of the surrounding vehicles.

B2. Driving Assistance System 12 Configuration

In the embodiment above, the forward camera 60 (camera information Ic) and the radar 62 (radar information Ir) are employed to detect the objects 500 ahead of the vehicle 10 (FIG. 1). However, for example, from the perspective of detecting the objects 500, there is no limitation thereto. For example, either one of the forward camera 60 or the radar 62 may be employed alone to detect the objects 500. Alternatively, for example, from the perspective of detecting the lane markings 104a, 104b, 104c, configuration may be made in which detected objects 500 are not detected.

In the embodiment above, the LKAS controller 84, the ALC controller 86, and the switching controller 88 are included in the single driving assistance ECU 68 (FIG. 1). However, for example, from the perspective of gradually changing the control amounts u1, u2 during switching between the ALC control and the LKAS control, there is no limitation thereto. For example, the LKAS controller 84, the ALC controller 86, and the switching controller 88 may be included in separate Electronic Control Units (ECUs).

B3. Driving Assistance ECU 68 Control

In the embodiment above, transition processing is performed when switching from the ALC control to the LKAS control (FIG. 2, FIG. 8B). In addition, or alternatively, transition processing may be performed during switching from the LKAS control to the ALC control.

In the embodiment above, explanation has been given regarding a configuration in which the LKAS control and the ALC control are switched in response to driver operation (FIG. 2). However, for example, from the perspective of switching smoothly between the ALC control and the LKAS control, there is no limitation thereto. For example, the present disclosure may be applied to automatic driving in which the driver does not operate the steering wheel 50.

In the example of FIG. 8B, the lane markings 104a, 104b, 104c are envisaged as being white lines on the road (continuous lines and intermittent lines). However, for example, from the perspective of the lane markings 104a, 104b, 104c that define the driving lane 100 and the target lane 102, there is no limitation thereto. For example, the lane markings 104a, 104b, 104c may be yellow lines, Botts Dots, or cats' eyes. Alternatively, the lane markings 104a, 104b, 104c may be a guard rail itself, or virtual markings set at a specific distance from a guard rail.

In the embodiment above, the target steering torque Tst_tar is employed as an example of the control amount u during transition processing (FIG. 3 to FIG. 6). However, for example, from the perspective of gradually changing the control amount u when switching between the ALC control and the LKAS control, there is no limitation thereto. For example, a target value (target lateral G) of lateral acceleration (lateral G) of the vehicle 10 may be applied. Alternatively, the target value for the vehicle speed V or a target value for the drive power when driving may be applied.

In the embodiment above, the transition processing is executed principally by the switching controller 88 (FIG. 6). However, from the perspective of increasing the control amount u by one out of the LKAS control or the ALC control while gradually decreasing another control amount u by the other out of the LKAS control or the ALC control, there is no limitation thereto. For example, in the transition processing (S5) in FIG. 2, the ALC controller 86 may gradually exclude the target torque Talc_tar, and the LKAS controller 84 may gradually introduce the target torque Tlkas_tar.

In the embodiment above, the LKAS reference position Plkas_ref and the ALC reference position Palc_ref themselves are employed (FIG. 8B). However, the reference positions Plkas_ref, Palc_ref may be employed as reference regions (target regions). Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A driving control device comprising:
   a lane marking recognition section that recognizes a lane marking from a surroundings image captured by an imaging section;
   a lane keeping controller that performs lane keeping control for a vehicle according to a recognition result by the lane marking recognition section for the lane marking;
   a lane change controller that performs lane change control from a first lane to a second lane while the vehicle is driving; and
   a switching controller that controls switching between the lane change control and the lane keeping control,
   wherein, when performing a switch between the lane change control and the lane keeping control, the switching controller sets a transition time-frame for performing the switch, and gradually switches between the lane change control and the lane keeping control during the transition time-frame.

2. The driving control device of claim 1, wherein during the transition time-frame, the switching controller executes both the lane change control and the lane keeping control, and decreases a ratio of a control amount of the vehicle by one of the lane change control and the lane keeping control, and increases a ratio of the control amount of the vehicle by the other of the lane change control and the lane keeping control.

3. The driving control device of claim 2, wherein:
   the lane change controller
   sets a first target location or a first target region in the second lane when changing from the first lane to the second lane,
   computes a first lane change target torque as the control amount, the first lane change target torque being a target steering torque to make the vehicle reach the first target location or the first target region, and
   after the vehicle has reached the first target location or the first target region, and until the transition time-frame elapses, continues to compute, as the control amount, the first lane change target torque or a second lane change target torque, the second lane change target torque being a target steering torque to make the vehicle reach a second target location or a second target region;
   the lane keeping controller, after the vehicle has reached the first target location or the first target region, computes a lane keeping target torque as the control amount, the lane keeping target torque being a target steering torque to keep the vehicle driving within the second lane; and
   the switching controller, during the transition time-frame, gradually decreases the ratio of the first lane change target torque or the second lane change target torque as the control amount, and gradually increases the ratio of the lane keeping target torque as the control amount.

4. The driving control device of claim 3, wherein the first target location and the first target region are set at a position en route to the second target location and the second target region, respectively.

5. The driving control device of claim 4, wherein the second target location and the second target region are set at a width direction center of the second lane, respectively.

6. The driving control device of claim 2, wherein during the transition time-frame, after the start of the transition time-frame, the switching controller gradually increases an absolute value of a time derivative value of a decreasing ratio of the control amount by one of the lane change control and the lane keeping control and an absolute value of a time derivative value of an increasing ratio of the control amount by the other of the lane change control and the lane keeping control, and then as the end of the transition time-frame approaches, the switching controller gradually decreases the absolute value of the time derivative value of the decreasing ratio of the control amount by the one of the lane change control and the lane keeping control and the absolute value of the time derivative value of the increasing ratio of the control amount by the other of the lane change control and the lane keeping control.

7. The driving control device of claim 2, wherein the control amount is a control amount of a steering control.

8. The driving control device of claim 2, wherein the control amount of the vehicle by the lane change control is a target steering torque required to execute the lane change control, and the control amount of the vehicle by the lane keeping control is a target steering torque required to execute the lane keeping control.

9. The driving control device of claim 1, wherein, during the transition time-frame, the switching controller starts the lane keeping control while maintaining the lane change control and gradually switches from the lane change control to the lane keeping control.

10. A driving control method comprising:
    recognizing, by a computer, a lane marking from a surroundings image captured by an imaging device;

performing, by the computer, lane keeping control for a vehicle according to a recognition result for the lane marking;

performing, by the computer, lane change control from a first lane to a second lane while the vehicle is driving; and switching, by the computer, between the lane change control and the lane keeping control by setting a transition time-frame for performing the switching, and gradually switching between the lane change control and the lane keeping control during the transition time-frame.

11. The driving control method of claim 10, wherein, during the transition time-frame, starting the lane keeping control while maintaining the lane change control and gradually switching from the lane change control to the lane keeping control.

12. The driving control method of claim 10, wherein during the transition time-frame, executing, by the computer, both the lane change control and the lane keeping control, and decreasing a ratio of a control amount of the vehicle by one of the lane change control and the lane keeping control, and increasing a ratio of the control amount of the vehicle by the other of the lane change control and the lane keeping control.

13. The driving control method of claim 12, wherein the control amount of the vehicle by the lane change control is a target steering torque required to execute the lane change control, and the control amount of the vehicle by the lane keeping control is a target steering torque required to execute the lane keeping control.

* * * * *